United States Patent
Seeberger et al.

(10) Patent No.: US 6,208,101 B1
(45) Date of Patent: Mar. 27, 2001

(54) PROCESS FOR LIMITING THE EXCESS FORCE OF AN ELECTRICALLY CONTROLLED AGGREGATE ACTUATED BY AN EXTERNAL FORCE WHEN IT NEARS ITS TOP OR BOTTOM STOP POSITIONS, IN PARTICULAR FOR A MOTOR VEHICLE WINDOW LIFTER NEARING ITS CLOSURE POSITION

(75) Inventors: Jürgen Seeberger, Baunach; Jörg Übelein, Grub am Forst, both of (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 0 days.

(21) Appl. No.: 09/214,796

(22) PCT Filed: Jul. 9, 1997

(86) PCT No.: PCT/DE97/01477

§ 371 Date: Jan. 11, 1999

§ 102(e) Date: Jan. 11, 1999

(87) PCT Pub. No.: WO98/02631

PCT Pub. Date: Jan. 22, 1998

(30) Foreign Application Priority Data

Jul. 12, 1996 (DE) .............................................. 196 28 203

(51) Int. Cl.$^7$ ...................................................... G05B 5/00
(52) U.S. Cl. ........................ 318/466; 318/264; 318/265; 318/266; 318/286; 318/415
(58) Field of Search ................................... 318/280, 445, 318/456, 457, 466–470, 474–477, 432–434, 264, 265, 266, 286

(56) References Cited

U.S. PATENT DOCUMENTS

| 4,468,596 | 8/1984 | Kinzl et al. ........................ 318/287 |
| 4,641,067 | 2/1987 | Iizawa et al. ....................... 318/287 |
| 5,436,539 | * 7/1995 | Wrenbeck et al. .................. 318/265 |
| 5,521,474 | * 5/1996 | Hahn .................................... 318/285 |
| 5,530,329 | * 6/1996 | Shigematsu et al. ............... 318/469 |
| 5,539,290 | * 7/1996 | Lu et al. .............................. 318/565 |
| 5,543,692 | * 8/1996 | Howie et al. ....................... 318/282 |
| 5,592,060 | * 1/1997 | Racine et al. ...................... 318/469 |
| 5,610,484 | * 3/1997 | Georgin .............................. 318/286 |
| 5,689,160 | * 11/1997 | Shigematsu et al. ............... 318/281 |
| 5,982,124 | * 11/1999 | Wang .................................. 318/466 |

FOREIGN PATENT DOCUMENTS

| 2902683 | 7/1979 | (DE) . |
| 3034118 | 3/1982 | (DE) . |
| 3532078 | 4/1986 | (DE) . |
| 0468361 | 1/1992 | (EP) . |
| 2026723 | 2/1980 | (GB) . |

* cited by examiner

*Primary Examiner*—Robert E. Nappi
*Assistant Examiner*—Tyrone Smith
(74) *Attorney, Agent, or Firm*—Christie, Parker & Hale, LLP

(57) ABSTRACT

A method for restricting the surplus force of an electrically controlled assembly operated by a foreign force, which can be used with particular advantage in connection with window lifters which are fitted with an anti-jam detection device. The method is characterized by a high automatic adaptation to the markedly fluctuating external conditions to which a window lifter is subjected, and by the compensation of system-conditioned fluctuations. The position of the assembly is continuously determined during the displacement process and at least one measured value correlated with the displacement force of the assembly is recorded in the inlet area of the stop position. This measured value is increased through the electronics unit by a predetermined amount and defined as a switch-off criterion so that the drive is switched off when this criterion is exceeded or understepped.

17 Claims, 2 Drawing Sheets

PROCESS FOR LIMITING THE EXCESS FORCE OF AN ELECTRICALLY CONTROLLED AGGREGATE ACTUATED BY AN EXTERNAL FORCE WHEN IT NEARS ITS TOP OR BOTTOM STOP POSITIONS, IN PARTICULAR FOR A MOTOR VEHICLE WINDOW LIFTER NEARING ITS CLOSURE POSITION

FIELD OF THE INVENTION

This invention relates to a method for restricting the surplus force of an electrically controlled assembly operated by a foreign force upon contact with an upper or a lower stop position, more particularly on hitting (or contacting) the closing position of a window lifter of a motor vehicle. The method is characterized by a high automatic adaptation to the markedly fluctuating external conditions, such as, temperature and dampness, to which the window lifter is subjected, as well as the compensation of system-conditioned fluctuations, such as scattering of maximum engine torque of an electric motor.

BACKGROUND OF THE INVENTION

From DE 30 34 118 C2, a method is known for the electronic monitoring of the opening and closing process of electrically operated assemblies, such as for example window lifters and sliding roofs of motor vehicles, wherein characteristic values of the assembly are detected and evaluated in a micro computer to ultimately generate setting signals for the electric setting member of the assembly. The aim of this method is to avoid any dangerous jamming of parts of the body and objects, despite the automatic opening and closing of a motor vehicle window. To this end, the process of opening and closing the window is divided into three areas. In order to allow a complete closing of the window pane it is necessary to switch off the system for detecting a jammed state just before the upper edge of the pane could reach the sealing area, otherwise the window pane would reverse. The setting member is thus only switched off when a sensor/electronics system has detected a blocking state of the assembly for a predetermined time period.

With the electric motor being able to develop its maximum torque, the window pane is pressed into the seal with the maximum force available. Surplus forces reach a very high value because the drive has to be designed according to the most unfavorable conditions anticipated. Consequently, tensions arise in the door which can be the cause of wind noises and even untight or loose areas. Also, there is a danger of increased wear on the window lifter mechanism. Furthermore, a stable design of the mechanical loading parts leads to more expensive material and greater weight.

SUMMARY OF THE INVENTION

The object of the invention is therefore to develop a method for restricting the surplus force of an electrically controlled assembly operated by a foreign force on hitting or contacting an upper or a lower stop position. More particularly, restricting the surplus force upon reaching the closing position of a window lifter of a motor vehicle which, through simple cost-effective means, prevents the occurrence of unnecessarily high surplus forces and at the same time safely guarantees reaching the stop position, more particularly the closing position, even when the starting conditions, such as voltage of the energy source, large manufacturing tolerances of the adjustment system and climatic factors, fluctuate quite considerably.

In the present invention, at least one measured value is detected in the inlet area of the stop position and is correlated with the displacement force of the assembly. This measured value is increased through the electronics unit by a predetermined amount (for example relative amount or amount calculated through a functional connection) and is defined as the switch-off criterion so that when this criterion is exceeded or understepped the drive is switched off.

The inlet area is regarded as the displacement area of the assembly which either begins just before reaching the stop position and ends after a following displacement path, or which only begins on reaching the stop position and ends after a further displacement path which causes an elastic deformation of at least a part of the displacement system. The most advantageous design can only be determined when taking into consideration the concrete conditions of each individual case. Determining the amount, more particularly the relative amount, by which the measured value is to be increased for safely reaching the stop position, is best carried out empirically.

In relation to a window pane of a motor vehicle, a characteristic field of measured values is recorded with the variation of the most important measuring factors acting on the movement of the window pane during the closing process and on hitting the lower stop position of the window pane. Such influencing factors are inter alia temperature, dampness, ice and some geometric tolerances which are important for the movement of the pane. From this characteristic field the case should then be selected where the torque requirement to be expected for safely hitting the stop position, more particularly the closing of the window pane, compared with the available torque of the motor, is used up to the greatest possible extent. From the measured values (e.g. electric current, the moment, the period length of the electric motor) correlated with these two torque values, it is possible to obtain a factor for generating the switch-off criterion. If the factor thus obtained for generating the switch-off criterion is then constantly applied to that in the inlet area of the upper and lower stop position, then the window pane is always completely closed and completely opened, respectively.

Naturally, it is possible to obtain a higher degree of adapting the method to the relevant prevailing conditions if the characteristic field, set up by measurements, is provided in the form of a table of values or even in the form of mathematically functional connections in the micro electronics unit.

According to a further variation of the invention, it is proposed to generate the switch-off criterion on the basis of a measured value correlated with: the displacement force before the first contact between the seal and the upper edge of the pane, and a measured value of the displacement force which was detected immediately after the upper edge of the pane entered into the seal.

The sealing area should thereby be no more than 50%. The measured value for the closing area is 25% to 50% of the depth of an inner displacement path of the sealing area in front of the seal. In each case it is to be ensured that the signal evaluation and generation of the switch-off criterion takes place sufficiently quickly. The advantage of the variation just described is that both the sliding properties of the window pane and the sealing properties are included in the calculation.

If crossing through the sealing area offers sufficient time for several measurements inside the seals, then the changing conditions inside the seal can also be measured and considered.

Advantageously, the invention can be used also for electrically controlled window lifters with anti-jam detection because all the pre-requisites for signal detection and signal evaluation are already provided here. When using an electromotor drive, it is readily possible, for example by means of an echo sensor, to use the period length as a correlation value for the displacement force because the motor characteristic field has a clear connection between the speed and torque. Likewise measured values of the electric current could be used for this purpose.

The method can also be used for hitting or contacting the lower stop in a similar way to the variation of the invention just described for closing the window pane. To this end, means are provided which contact the window pane just before the stop position is reached and cause a reduction in the motor speed and thus an increase in the period length. Such means for producing local slow motions can be readily formed as spring elements or elastic damping elements. For elastic damping elements, the inlet area only begins with contact of the damping element and ends after a further displacement path of the displacement system, which causes an elastic deformation of the damping element.

At this point it should be pointed out that the inherent elasticity of several displacement systems, more particularly arm window lifters, is so great that no additional damping elements need be used for hitting the stop positions. The inlet area hereby starts on reaching the stop and ends after a further displacement path of the displacement system which causes an elastic deformation of the displacement system.

Through this method, it is ensured that the conditions prevailing overall are taken into consideration each time on hitting or upon contacting the stop positions so that the displacement force is provided in just the sufficient amount. Undesired surplus forces are hereby minimized.

In view of the possibility of differences occurring, considerably more than 100% relative to the available displacement force when comparing two displacement systems of the same type, obviously the surplus force restriction also provides possibilities for structural improvements, which can be directed to saving weight for example.

BRIEF DESCRIPTION OF THE DRAWINGS

The invention will now be explained in further detail with reference to an embodiment of a window lifter and the drawings in which.

DETAILED DESCRIPTION OF THE PREFERRED EMBODIMENTS

Figure 1:
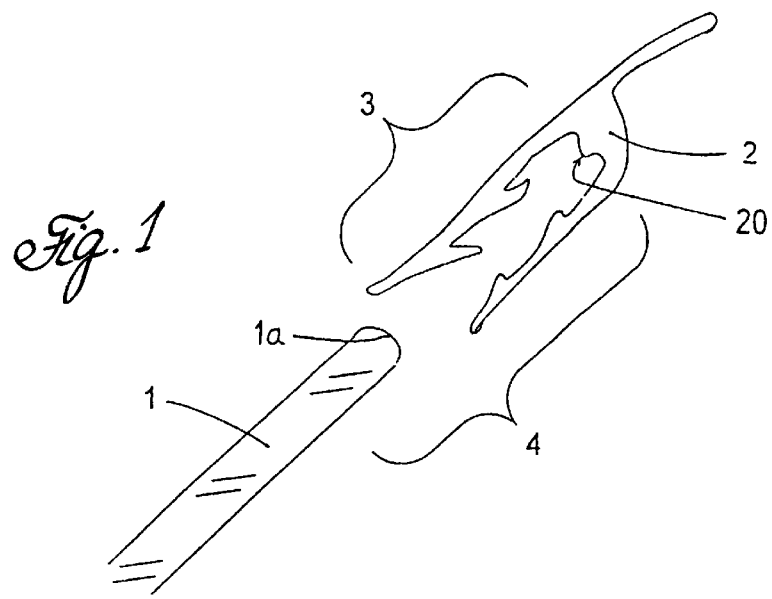
FIG. 1 is a sectional view of a window pane of a motor vehicle with a seal for the upper edge of the pane.

The diagrammatic illustration of FIG. 1 shows in particular the parts relating to the sealing area/closing area 3 and the seal inlet area 4. The window pane 1 is located with its closing edge 1a directly at the start of the sealing area 3 but without having already contacted the seal 2. The seal inlet area 4, in which at least one measured value is detected correlating with the displacement force of the window pane, starts roughly at a distance from the seal 2 corresponding to about 25% to 50% of the extension of the sealing area 3, and ends level with the mechanical stop 20.

The positions of the assembly during a displacement process and in an inlet area (4, 4', 4") of the stop position (20, 7, 7') are continuously detected by technical measuring means. At least one measured value correlated with a displacement force of the assembly is recorded. The measured value is increased through an electronics unit by a predetermined amount and is defined as the switch-off criterion so that a drive is switched off when this criterion is exceeded or understepped.

When the closing edge 1a of the window pane 1 reaches the inner stop 20 of the seal 2, the closing process is basically regarded as finished. However, it is advantageous to operate the electromotor drive just a little more to slightly tension the displacement system. This provides extra security for correctly and permanently reaching the controlled stop position. As a result, acceleration along the displacement axis does not lead to relative movements of the displacement object nor the noises connected therewith. Unnecessarily large tensions in the system are avoided by a determination of the suitable switch-off criterion and the amount required to turn off the system.

Figure 2:
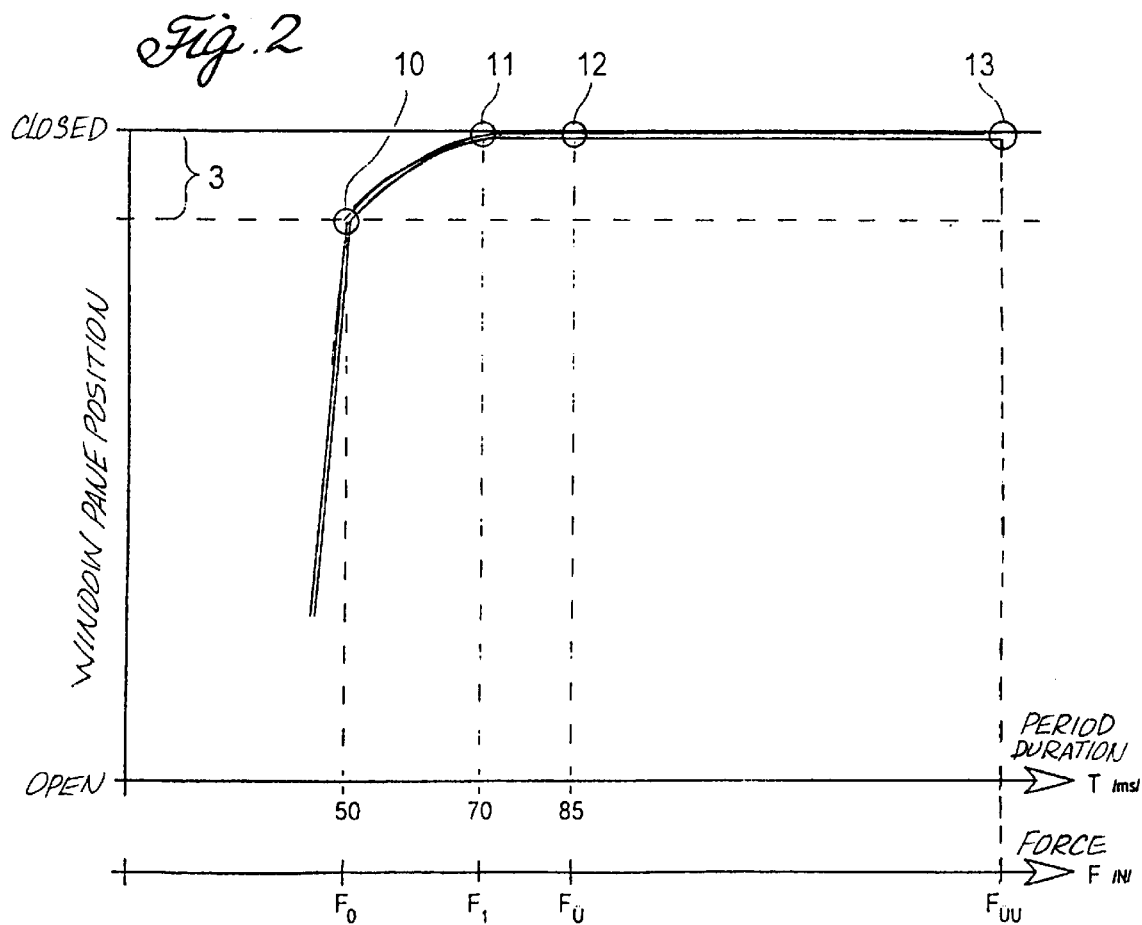
FIG. 2 is a diagrammatic illustration showing the change in the force acting on the window pane versus position.

An embodiment of the invention will now be explained in further detail with reference to the diagrammatic illustration of FIG. 2. The period length T (in milliseconds) of the drive shaft and displacement force F (in Newton) are entered respectively on the abscissa. The ordinate indicates the position of the window pane 1 between the fully opened state (OPEN) and the fully closed state (CLOSED) in front of which the sealing area 3 extends.

The illustrated curve shows the principle course of the displacement force F and the period length T during the displacement process of the window pane 1. In general the displacement forces rise slightly as a result of slightly increasing friction in the side guide elements which leads to a corresponding reduction in the motor speed and thus to an increase in the period length T.

According to the present embodiment the period length for reaching the sealing area 3 at point 10 amounts to 50 ms. This measured value serves as a basis for generating the switch-off criterion in which the measured value is increased by a certain amount. The increase can however take place according to one of the methods already described in the summary, for example, through multiplication with a factor from a table of values which is provided in a micro computer. In this case the increase factor has the value 1.7. Thus the value for the switch-off criterion is produced as 50 ms×1.7=85 ms. The drive is switched off as soon as the sensor/electronics system detects a period time T which exceeds 85 ms.

At point 11 the closing edge of the window pane 1 reaches the stop 20 of the seal 2 with a displacement force F1. Since at this point 11 the period length with T=70 ms still lies below the switch-off criterion of T=85 ms, there is now a force build up until F=FU. The surplus force which is produced from the difference, FU−F1, remains very small because the drive is stopped just shortly after reaching the closing position.

Without the surplus force restriction according to the invention, the motor would increase the displacement force F up to the point 13 with a force FUU if it is assumed that the motor has reached its maximum torque at this point 13. The surplus force is produced from the difference FUU−F1, which amounts to a multiple of the surplus force restricted according to the invention.

In addition to hitting or contacting the described closing position, the method is also suitable for hitting or contacting the position of the assembly (e.g. window lifter, sliding roof) in which the largest possible opening is reached. This happens on reaching the lower stop position.

Figure 3:
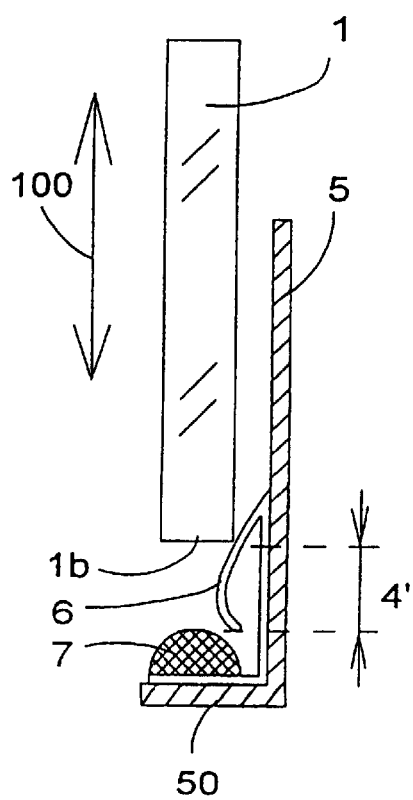
FIG. 3 is a sectional view of a window pane of a motor vehicle with a guide rail and a lower stop with a friction element mounted at the side.

FIG. 3 shows in a heavily simplified diagrammatic illustration a section through a guide rail 5 of a cable window lifter along which a window pane 1 is displaced. An angular deflection of the guide rail 5 forms the stop 50 which is associated with a friction element in the form of a spring 6 and an elastic damping element 7, made, for example, of rubber. Upon hitting the lower stop 50, the lower edge 1*b* first strikes the spring 6 which is mounted in front of the stop 5. The stop 5 is aligned according to the displacement axis 100, and is located in front of the damping element 7 which is supported on the side arm of the guide rail 5.

The inlet area 4', analogous to the inlet area 4 according to FIG. 1 (for hitting the closing position of a window pane), is defined for the embodiment of FIG. 3 so that it starts with the first contact of the lower edge 1*b* of the pane with the spring 6 and ends with the contact of the damping element 7. The spring 6 causes a sudden and easily sensed slow motion of the window pane 1. Naturally the inlet area 41 can also be extended somewhat further upwards so that its start lies above the spring 6 and information from this displacement area can be used for governing the lower stop position.

The choice of a large inlet area 4' is particularly advantageous if a comparatively long displacement path has to be covered for generating a measuring signal for generating the switch-off criterion and/or after the switch-off command for the drive, it is anticipated that the assembly will run on so far that a sufficient restriction of the surplus force can no longer be safely guaranteed.

Figure 4:
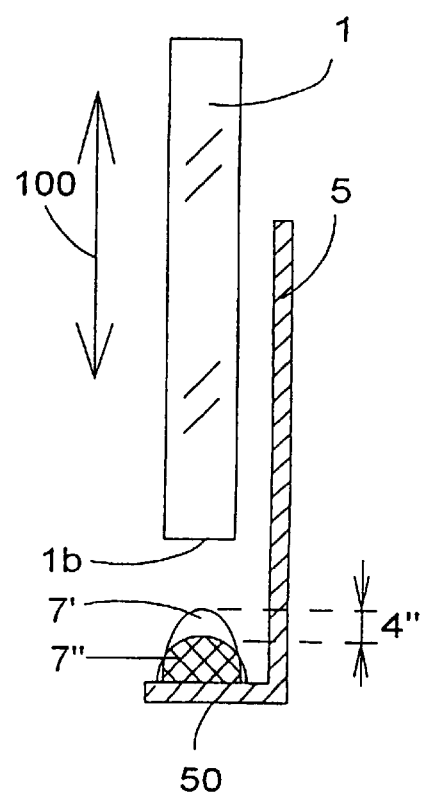
FIG. 4 is a sectional view of a window pane of a motor vehicle with a guide rail and a lower stop of elastic material with relatively large (elastic) deformability.

FIG. 4 shows an embodiment which is slightly modified compared with FIG. 3 and which has a very small inlet area 4". The inlet area 4" is formed by a deformation zone of the elastic damping element whereby the non-deformed state of the damping element is marked 7' and the deformed state of the damping element is marked 7'. Short inlet areas 4" of this kind can be used without a problem if a comparatively dense signal sequence is generated on the displacement path and/or a high inherent elasticity of the displacement system is present.

The measured value of the correlation factor can correspond to a measured value which was determined after the assembly strikes the elastic stop 7, 7'.

At this point it should be pointed out that the springs and damping elements described can also be fixed in the area of the lower edge 1*b* of the pane or mounted on an entrainment member (not shown) for the window pane 1.

What is claimed is:

1. A method for restricting surplus force of an electronically controlled window lifter upon contacting at least one stop position whereby an upper edge of a window pane reaches a stop of a seal, the method comprising:

continuously detecting positions of the pane during a displacement process;

recording at least one measured value correlated with a displacement force of the pane after entrance of an upper edge of the pane into at least about 25% of a depth of an inner displacement path of a sealing area of the seal; and increasing the measured value through an electronics unit by a predetermined amount to define a switch-off criterion so that a drive of the window lifter is switched off when this criterion is one of exceeded and understepped.

2. The method according to claim 1 further comprising determining the stop position.

3. The method according to claim 1 wherein the measured value correlated with the displacement force of the pane is one of an electric current, a moment and a period length of a drive shaft of an electric motor.

4. The method according to claim 1 further comprising determining the increased amount as a percentage value on the basis of the previously measured value correlated with the displacement force of the pane.

5. The method according to claim 1 wherein the measured value correlated with the displacement force of the pane corresponds to the measured value immediately prior to the pane striking the stop.

6. The method according to claim 5 further comprising determining the measured value for the sealing area of the displaceable window pane when the pane is in an area which is 25% to 50% of a depth of an inner displacement path of the sealing area in front of the seal.

7. The method according to claim 1 wherein the measured value correlated with the displacement force of the pane is determined after the upper edge of the pane has covered at most half of a displacement path lying in the sealing area.

8. The method according to claim 1 further comprising:

recording a measured value correlated with a displacement force of the assembly directly in front of the seal; and generating the switch-off criterion by using a ratio of the value measured directly in front of the seal and the value measured after the upper edge of the pane enters into the seal.

9. The method according to claim 8 wherein the ratio of the two measured values for generating the switch-off criterion is related to the measured value recorded directly in front of the seal.

10. The method according to claim 8 wherein the ratio of the two measured values for generating the switch-off criterion is related to the measured value recorded after the inlet of the upper edge of the pane.

11. The method according to claim 1 wherein the measured value correlated with the displacement force of the pane corresponds to a measured value correlated with the displacement force of the pane which is determined after the pane strikes an elastic stop.

12. The method according to claim 1 further comprising generating the switch-off criterion on the basis of at least two measured values correlated with the displacement force of the pane recorded after the upper edge of the pane has entered into the sealing area.

13. A device for restricting surplus force of an electronically controlled window pane operated by a foreign force of a motor vehicle upon contacting at least one stop position, wherein an upper edge of the window pane reaches a stop of a seal, the device comprising:

a position detector that continuously detects the position of the pane in at least one of during displacement of the pane and in an inlet area of the stop position;

a recorder that records at least one measured value correlated with a displacement force of the pane after entrance of an upper edge of the pane into at least about 25% of a depth of an inner displacement path of a sealing area of the seal; and a switch-off criterion determined by one of increasing and decreasing the measured value through an electronics unit by a predetermined amount, wherein a drive is switched off and the window pane stops inside of the sealing area when this criterion is one of exceeded and understepped, respectively.

14. The device of claim 13 further comprising a friction element which increases the slow motion of the window pane before reaching the stop position.

15. A method for restricting surplus force of an electronically controlled window lifter upon contacting at least one stop position in a sealing area of a seal, the method comprising:

continuously detecting positions of a window pane during a displacement process;

recording a measured value correlated with a displacement force of the pane after entrance of an upper edge of the pane into at least about 25% of a depth of an inner displacement path of the sealing area of the seal; and increasing the measured value through an electronics unit by a predetermined amount to define a switch-off criterion such that a drive of the window lifter is switched off and the window pane stops inside of the sealing area when this criterion is one of exceeded and understepped.

16. The method of claim 1 wherein the at least one measured value correlated with a displacement force of the pane is recorded when the upper edge is at about 25% of the depth of the inner displacement path of the sealing area of the seal.

17. The device according to claim 14 wherein the friction element is formed as a spring.

* * * * *